United States Patent [19]

Doumani

[11] 4,073,411

[45] Feb. 14, 1978

[54] FREEZE-THAW STABLE EMULSION COOKWARE LUBRICANT

[75] Inventor: Charles Doumani, Los Angeles, Calif.

[73] Assignee: Blue Cross Laboratories, Inc., North Hollywood, Calif.

[21] Appl. No.: 692,485

[22] Filed: June 3, 1976

[51] Int. Cl.² .................... C08L 91/00; C09K 3/30; B65D 83/14
[52] U.S. Cl. .................... 222/192; 106/244; 106/267; 252/49.5
[58] Field of Search ............... 252/312, 49.5; 106/244, 106/267; 222/192

[56] References Cited

U.S. PATENT DOCUMENTS

| 1,934,005 | 11/1933 | Rewald | 252/312 |
| 3,896,975 | 7/1975 | Follmer | 106/287 R |

FOREIGN PATENT DOCUMENTS

| 1,302,524 | 1/1973 | United Kingdom | 426/609 |

*Primary Examiner*—Theodore Morris
*Attorney, Agent, or Firm*—Louis J. Bachand

[57] ABSTRACT

Freeze-thaw stable water-in-oil lecithin emulsion cookware lubricant is obtained with an organic phase free of hydrocarbon liquids having a specific gravity above 0.80, and comprising in proportions to provide the composition an acid number not higher than 12: from 1 to 10 parts of a lecithin having an acid number between about 12 and 34; from 0 to about 8 parts of a vegetable oil having an acid number less than about 1; from 2 to 7 parts of a liquid, saturated aliphatic compound having a specific gravity not higher than 0.75; a freeze-thaw stabilizing-effective amount of an organic polyol having a molecular weight between about 76 and 360; and an emulsifying-effective amount of an edible fatty acid ester emulsifier having an acid number not higher than 15; and therewith an inorganic aqueous phase comprising the balance to 100 parts of the composition, all parts being by weight.

20 Claims, No Drawings

# FREEZE-THAW STABLE EMULSION COOKWARE LUBRICANT

BACKGROUND OF THE INVENTION

This invention has to do with cookware lubricant compositions based on lecithin. More particularly the invention is concerned with water-in-oil emulsion cookware lubricants stable against freeze-thaw cycles typically encountered in wintertime shipment of product and which is hydrolysis stable as well.

As such, the invention relates to improvements in lecithin based cookware lubricant products generally of the type comprising lecithin in a delivery system for thin film application, as a fluid, onto the surface to be lubricated. Commencing perhaps with the invention disclosed in U.S. Pat. No. 2,796,363 to Lalone, the thin film application of fluidized lecithin has been popularized as a healthful, low cost, natural and cholesterol-free way to obtain lubricity on cooking surfaces especially frying pans. In the Lalone patent, in companion U.S. Pat. No. 3,038,816 to Drell and Rubin and in its commercial counterpart PAM, the lecithin or equivalent ester is dissolved in a fluorocarbon propellant; the solution upon being sprayed volatilizes off the propellant leaving a fine mist of lecithin coming out of solution onto the pan surface being treated.

The increasing cost of fluorocarbon propellants, in dollars owing to the petrochemical supply situation, and in social terms because of supposed impact upon the earth's ozone layer of released fluorocarbons, has caused manufacturers to look to alternatives to fluorocarbon solutions of lecithin. One effort is recorded in U.S. Pat. No. 3,661,605 to Rubin and Meyerhoff, wherein a specific hydroxylated form of lecithin was found to be emulsifiable in water and to be propellable with nonfluorocarbon propellants. No commercial use of the Rubin-Meyerhoff is known to me.

Another worker in the art patented a water-in-oil emulsion system which obtained good dispersion of lecithin without use of fluorocarbons, at substantially lower cost and with other attendant economic and social benefits described in U.S. Pat. No. 3,896,975 to Follmer. The product has been commercially sold under the trademark PAN PAL.

It has been found that upon exposure to freezing temperatures, sometimes followed by a warmer condition, and then colder as may be encountered in winter shipments of product in the continental Midwest and Northwest, that a breakdown of the lecithin water-in-oil emulsion is experienced, limiting the utility of the product and causing consumer dissatisfaction based on clogging of delivery nozzles, abnormal appearance of the product, odor or inadequacy of lubricity.

SUMMARY OF THE INVENTION

It is an object of the present invention to retain the manifold advantages of a lecithin water-in-oil emulsion product deliverable by nonfluorocarbon propellant and to add thereto the further advantage of freeze-thaw stability, i.e., the ability to cycle through colder, even freezing, and then warmer, then colder temperature regimes without loss of emulsion, lubricating effectiveness, desired appearance or other wanted characteristics.

It has been found that elimination of freeze-thaw cycle problems without loss of the other desirable attributes of the Follmer type composition necessitates adjustment of all components of the system relative to each other and does not admit of mere use of additives in known systems. Further, control of overall acid number for the composition appears to be a major factor in arriving at the desired balance of system components. Additionally, it has been observed that other beneficial effects result from a tailoring of a lecithin water-in-oil emulsion system to be freeze-thaw stable; e.g., hydrolysis resistance is enhanced in the final product.

More specifically then, the present invention provides a freeze-thaw stable and hydrolysis stable, water-in-oil emulsion composition of lecithin adapted for aerosol delivery onto cookware for cooking surface lubrication, the composition consisting essentially per 100 parts by weight of (a) an organic phase free of hydrocarbon liquids having a specific gravity above 0.80, which phase comprises in proportions to provide to the composition an acid number not higher than 12: from 1 to 10 parts of a lecithin having an acid number between about 24 and 34; from 0 to about 8 parts of a vegetable oil having an acid number less than about 1; from about 2 to 7 parts of a liquid, saturated aliphatic compound having a specific gravity not higher than 0.75; a freeze-thaw stablizing effective amount of an organic polyol having a molecular weight between about 76 and 360; and an emulsifying effective amount of an edible fatty acid ester emulsifier having an acid number not higher than 15; and (b) an inorganic phase comprising the balance to 100 parts of the composition, which inorganic phase comprises water.

Typically the vegetable oil is the glyceryl ester of a fatty acid, e.g., of lauric, linoleic, oleic, or linolenic acids. The emulsifier may typically comprise one or more of mono- and diglycerides of fatty acids, phosphate esters of mono- and diglycerides, sorbitan mono- and trioleates, and sorbitan mono- tri-stearates. The liquid saturated aliphatic compound typically comprises one or more of octane, nonane, and decane. The organic polyol, which preferably is present in an amount between 1 and 5 parts by weight per 100 parts of the composition, typically comprises one or more of glycerol, sorbitol, propylene glycol, glucose, dextrose, lactose, and sucrose, i.e., organic polyols of the formula $(R)-OH_x$, in which R is representative of a saturated aliphatic moiety having from 3 to 12 carbon atoms, and a valence of $x$, wherein $x$ is an integer from 2 to 6, and particularly sorbitol when the saturated alkane material is a mixture of alkanes having from 8 to 10 carbon atoms.

Generally, relatively small amounts of lecithin are effective and used. Thus, lecithin may typically be present in an amount from 2 to 4 parts by weight per 100 parts of the composition.

In particularly preferred embodiments, there is provided a freeze-thaw and hydrolysis-stable, water-in-oil emulsion composition of lecithin adapted for aerosol delivery onto cookware for cooking surface lubrication, the emulsion composition consisting essentially per 100 parts by weight of (a) an organic phase free of hydrocarbon liquids having a specific gravity above 0.80, said organic phase comprising in proportions to provide the composition an Acid No. not higher than 12: from 2 to 4 parts of lecithin having an Acid No. between about 24 and 34; from about 2 to about 8 parts of a vegetable oil having an Acid No. less than about 1 and comprising a glyceryl ester of fatty acid; from about 2 to 7 parts of liquid alkanes having a specific gravity not higher than 0.75 selected from octane, nonane, decane and mixtures thereof; from 2 to 4 parts of polyol selected from glycerol, sorbitol, propylene glycol, glucose, dextrose, sucrose and mixtures thereof; and from 2 to 4 parts of fatty acid emulsifier having an Acid No. not higher than 15; and (b) 50 to 90 parts of an inorganic phase comprising the balance to 100 parts of the composition, which inorganic phase comprises water. Highly preferred compositions employ sorbitol or glycerol as the polyol; a vegetable oil selected from soybean oil, safflower oil, peanut oil, olive oil, corn oil, coconut oil, cottonseed oil, palm nut oil, apricot kernal oil and mixtures comprising one or more such oils; and water phase in an amount from 70 to 85 parts by weight per 100 parts of the emulsion composition.

As noted the described lecithin emulsion composition is adapted for aerosol propellant delivery and for this purpose, the invention further contemplates a package comprising a valved, pressure-resistant container, and within the container the emulsion composition described, and also propellant comprising nomally gaseous materials liquefiable at pressures less than about 90 psig and selected from hydrocarbons containing from 3 to 5 carbon atoms inclusive, chloro- and/or fluoro-substituted hydrocarbons containing from 1 to 6 carbon atoms, carbon dioxide, nitrogen, nitrous oxide and mixtures thereof, in an amount sufficient to propel the composition from the container responsive to valve actuation. Typically the package may contain from 1 to 4 parts by weight of the propellant per part by weight of the emulsion composition.

The invention further contemplates a highly preferred method for the preparation of water-in-oil emulsion composition of lecithin in an aerosol propellant containing package including in sequence the steps of adding to a pressure resistant container open to the atmosphere an organic phase containing the lecithin component, said phase being warmer than about 20° C, adding water in emulsion forming proportions and without substantial emulsification closing the container to the atmosphere, and injecting nomally gaseous liquid propellant in a container pressurizing amount into the container in a manner emulsifying together the water and lecithin to a water-in-oil emulsion of said lecithin.

DESCRIPTION OF THE PREFERRED EMBODIMENTS

As previously mentioned this invention is specifically concerned with particular formulations of water-in-oil emulsions which when packaged for aerosol propellant delivery will maintain its integrity despite being subjected to repeated freeze-thaw cycles during the course of shipment to the consumer. It is commercially important that lecithin emulsion products being shipped through freezing and lower temperature zones not "break" their emulsified condition upon thawing, to leave a watery, heterogenous mixture, oil-in-water system, very different in properties from the originally prepared water-in-oil emulsion system. The consumer may notice, for example that the oil-in-water (broken emulsion) system runs and steams when heated in a pan; whereas the intended water-in-oil system will nearly invisibly vaporize when so heated. Naturally prior art systems which were organic solvent solutions of lecithin, being anhydrous, did not have problems with water freezing during shipment, but water-containing emulsion systems are subject to this failing in the absence of preventative action. The consumer expects uniformity of product and consistency of behavior; erratic appearance is a source of consumer complaint, even if function is not technically affected.

It has now been discovered that the addition of a polyol as herein defined in small, but effective amounts, to a defined lecithin system in which both components and concentrations are controlled to maintain a critical Acid No. level will inhibit or prevent these desired water-in-oil emulsions from a "breaking" reversion to a watery, oil-in-water heterogeneity despite repeated cycling through freeze-thaw conditions. It is further true of the compositions herein disclosed that hydrolysis of the vegetable oil and ester components is inhibited in the presence of the polyol, reducing another problem encountered in aerosol propellant packaged lecithin spray systems.

With reference to specific components of the present compositions, useful lecithins are adequately described in the several patents noted hereinabove, commercially available lecithins being preferred for availability and cost advantages. Such lecithins typically are sticky and viscous materials dispersed in soy oil, their phosphated content being surface active at least in conjunction with other components of the present compositions. As is known, a part of the lecithin phosphatide molecule is hydrophilic, another part hydrophobic. The utility of lecithin as a pan lubricant derives from its resultant surface active properties enabling the lecithin to emulsify, stabilize, lubricate, inhibit fat hydrolysis and act as an anti-oxidant. Lecithins useful herein have an Acid No. of 24–34. "Acid No." herein has reference to milligrams of KOH neutralized per gram of material. Lecithins having Acid No. values in excess of 34 are prone to formation of an oil-in-water emulsion. Lecithin is typically present in an amount of from about 1 to 10 and preferably 2 to 4 parts per 100 parts by weight of the composition.

In addition to the described lecithin, the organic phase may employ per 100 parts by weight, 0 or from about 2 to about 8 parts of a vegetable oil having an Acid No. less than about 1, such as a food grade salad oil. Soy oil is low in cost and effective, and it is akin to the soy oil found in soybean lecithin. Generally vegetable oils comprising glyceryl esters of fatty acids such as lauric, linoleic, olive or linolenic acids are useful. Specific oils that may be mentioned are these, having an Acid No. of less than about 1: safflower oil, peanut oil, oliver oil, corn oil, coconut oil, cottonseed oil, palm nut oil, apricot oil and mixtures thereof with one another and other suitable vegetable oils, i.e., oils that are food safe and have the desired Acid No. characteristic.

The composition organic phase further contains edible, food grade emulsifiers, liquid or semi-solid compounds functioning to promote water-in-oil emulsions, and themselves having an Acid No. not higher than 15, such as an typically those comprising one or more of monoglycerides ad diglycerides of fatty acids, monosodium phosphate esters of monoglycerides and diglycerides, sorbitan monooleate and sorbitan monostearate. Useful commercial emulsifiers are Atmos 300, Span 85, Atmul 86VS and Atmul 80.

The composition organic phase further contains a small quantity of saturated hydrocarbon solvent, i.e., a liquid saturated aliphatic or alkane compound having a specific gravity not higher than 0.75, preferably essentially free of aromatic hydrocarbons and specifically an alkane of 8 to 10 carbon atoms: octane, nonane, decane and mixtures thereof. Generally from 2 to 7 parts by weight per 100 parts of the total composition are employed of the mentioned solvent. This component of the composition is important in easing achieving complete emulsification of the water content, and assists in pan release of food cooked using the present composition. Preferred alkanes are Isopars available from Exxon as Isopar C, G and E.

The organic phase further includes a small amount of a polyol, e.g., from 1 to 5 parts by weight per 100 parts of the total composition, lower or higher amounts being usable but less effective or unnecessary respectively, to the freeze-thaw performance desired in the noted compositions when packaged under aerosol propellant pressure. Thus the addition of the indicated amount of polyol prevents the breakdown or reversion of the composition, once emulsified, to a watery, heterogenous oil-in-water system after repeated cycles of thaw and freezing. The use of polyol in the composition in conjunction with the alkane $C_8$–$C_{10}$ component described above, enhances pan release properties of the product. Suitable polyols are those acceptable for use in a food product; preferred is the use of 2 to 4 parts of organic polyols having the structural formula (R)—$OH_x$ in which R is a saturated aliphatic moiety having from 3 to 12 carbon atoms and a valence of $x$, $x$ being an integer from 2 to 6. Thus useful polyols typically have a molecular weight between 76 and 360 and include glycerol, sorbitol, propylene glycol, glucose, dextrose and sucrose. Sorbitol or glycerol is the preferred polyol component of the composition in the exemplary formulation below.

The inorganic or (b) phase of the composition is water and generally comprises from 50 to 90 parts by weight per 100 parts of the composition, and preferably 70 to 85 parts thereof.

EXAMPLE

An aerosol propellant packaged freeze thaw stable and hydrolysis stable lecithin emulsion was prepared as follows. To a pressure resistant conventional aerosol container there was added a. an organic phase warmed to about 40° to be above room temperature of 20° C and comprising (parts by weight)

Lecithin: 2.8 parts
Soy oil: 2.4 parts
Atmos 300: 2.4 parts
Alkanes $C_8$–$C_{10}$: 5.7 parts
Glycerol: 2.4 parts and an inorganic phase comprising Water: 84.3 parts The container top and valve were crimped on to close the container contents to the atmosphere and propellant (a mixture of propane, isobutane and n-butane) was injected at a weight ratio of 3 to 1 of emulsion composition to propellant under pressure through the valve, to provide a pressure of 46–70 psig within the container. The liquid phases were emulsified to a water in oil emulsion.

Other propellants can be used including hydrocarbons and halo-substituted hydrocarbons and inorganic gases such as nitrogen, carbon dioxide and nitrous oxide provided that dispensing pressures, e.g., 40–90 psig are obtained. Preferred propellants are those nomally gaseous materials liquefiable at pressures less than about 90 psig and comprising hydrocarbons containing from 3 to 5 carbon atoms inclusive, chlorine and/or fluorine substituted hydrocarbons containing from 1 to 6 carbon atoms, carbon dioxide, nitrogen, nitrous oxides and mixtures thereof.

The packaged product of the Example was stored in a home refrigerator freezer for 8 hours at 0° F. The product was then allowed to thaw at room temperature about 20° C for about 4 hours. This cycle was repeated time and again. Following the thaw portion of the cycles, the product spray was occasionally evaluated for appearance on a surface. In each instance the appearance was uniform, homogeneous and attractive. By contrast, a commercial formulation not containing a polyol was heterogenous, runny and unattractive when similarly cycled and evaluated. The efficacy of the cycled product was evaluated by spraying the product into muffin tin cups and baking muffins. After baking was complete the tins were inverted. Use of the above product resulted in 100% of the muffins dropping out, indicative of good lubricating performance by the product, even after repeated cycling.

The example formulation, and other herein may employ small but effective amounts of the usual additives for their usual purposes. Thus flavoring and coloring agents, e.g., vanillin, synthetic butter oil, carotene coloring matter, and other additives such as preservatives may be used.

I claim:

1. A freeze thaw-, and hydrolysis-stable, water-in-oil emulsion composition of lecithin adapted for aerosol delivery onto cookware for cooking surface lubrication, said emulsion composition consisting essentially per 100 parts by weight of (a) an organic phase free of hydrocarbon liquids having a specific gravity above 0.80, which phase comprises in proportions to provide to the composition an Acid No. not higher than 12: from 1 to 10 parts of a lecithin having an Acid No. between 24 and 35; from 0 to about 8 parts of a vegetable oil having an Acid No. less than about 1; from about 2 to 7 parts of a liquid, saturated aliphatic compound having a specific gravity not higher than 0.75; a freeze thaw-stabilizing effective amount of an organic polyol having a molecular weight between about 76 and 360; and an emulsifying effective amount of an edible fatty acid ester emulsifier having an Acid No. not higher than 15; and (b) an inorganic phase comprising the balance to 100 parts of the composition, which inorganic phase comprises water.

2. Emulsion composition according to claim 1 in which said vegetable oil is the glyceryl ester of a fatty acid.

3. Emulsion composition according to claim 2 in which said ester is an ester of lauric, linoleic, oleic, or linolenic acid.

4. Emulsion composition according to claim 1 in which said emulsifier comprises one or more of mono- and di-glycerides of fatty acids, monosodium phosphate esters of mono and di-glycerides, sorbitan mono-and tri oleates, and sorbitan mono-and tri stearates.

5. Emulsion composition according to claim 1 in which said liquid saturated aliphatic compound is one or more of octane, nonane and decane.

6. Emulsion composition according to claim 1 in which said organic polyol has the formula (R)—$OH_x$, in which R is representative of a saturated aliphatic moiety having from 3 to 12 carbon atoms and a valence of $x$, and $x$ is an integer from 2 to 6.

7. Emulsion composition according to claim 6 in which said polyol comprises one or more of glycerol, sorbitol, propylene glycol, glucose, dextrose and sucrose.

8. Emulsion composition according to claim 7 in which said polyol is present in an amount between 1 and 5 parts by weight per 100 parts of the composition.

9. Emulsion composition according to claim 8 in which said lecithin is present in an amount from 2 to 4 parts by weight per 100 parts of the composition.

10. Emulsion composition according to claim 9 in which said polyol is sorbitol, said liquid aliphatic saturated alkane is a mixture of alkanes having 8 to 10 carbon atoms.

11. A package comprising a valved, pressure-resistant container and within the container the emulsion composition according to claim 1, and also propellant comprising normally gaseous materials liquefiable at pressures less than about 90 psig and selected from hydrocarbons containing from 3 to 5 carbon atoms inclusive, chlorine an/or fluorine substituted hydrocarbons containing from 1 to 6 carbon atoms, carbon dioxide, nitrogen, nitrous oxide, and mixtures thereof, in an amount sufficient to propel said composition from the container responsive to valve actuation.

12. A freeze thaw-, and hydrolysis-stable, water-in-oil emulsion composition of lecithin adapted for aerosol delivery onto cookware for cooking surface lubrication, said emulsion composition consisting essentially per 100 parts by weight of (a) an organic phase free of hydrocarbon liquids having a specific gravity above 0.80, said organic phase comprising in proportions to provide said composition an Acid No. not higher than 12: from 2 to 4 parts of lecithin having an Acid No. between about 24 and 34; from about 2 to about 8 parts of a vegetable oil having an Acid No. less than about 1 and comprising a glyceryl ester of fatty acid; from about 2 to 7 parts of liquid alkanes having a specific gravity not higher than 0.75 selected from the group consisting of octane, nonane, decane and mixtures thereof; from 2 to 4 parts of polyol selected from the group consisting of glycerol, sorbitol, propylene glycol, glucose, dextrose and sucrose polyol and mixtures thereof; and from 2 to 4 parts of fatty acid emulsifier having an Acid No. not higher than 15; and (b) from 50 to 90 parts of an inorganic phase comprising the balance to 100 parts of the composition, which inorgaic phase comprises water.

13. Emulsion composition according to claim 12 in which said polyol is sorbitol or glycerol.

14. Emulsion composition according to claim 13 in which said vegetable oil selected from the group consisting of one or more of soybean oil, safflower oil, peanut oil, olive oil, corn oil, coconut oil, cottonseed oil, palm nut oil, apricot kernal oil, and mixtures thereof.

15. Emulsion composition according to claim 14 in which said polyol is sorbitol or glycerol.

16. Emulsion composition according to claim 15 in which said water inorganic phase comprises from 70 to 85 parts by weight per 100 parts of said composition.

17. A package comprising a valved, pressure resistant container and within the container the emulsion composition according to claim 16 and propellant in an amount sufficient to propel said composition from the container responsive to valve actuation.

18. The package according to claim 17 in which said propellant is selected from the group consisting of normally gaseous materials liquefiable at pressures less than about 90 psig and comprising hydrocarbons containing from 3 to 5 carbon atoms inclusive, chlorine and/or fluorine substituted hydrocarbons containing from 1 to 6 carbon atoms, carbon dioxide, nitrogen, nitrous oxide, and mixtures thereof.

19. The package according to claim 18 in which said package contains from 1 to 4 parts by weight of said propellant per part of emulsion composition.

20. Method of preparing a water-in-oil emulsion composition of lecithin in an aerosol propellant containing package including in sequence the steps of adding to a pressure resistant container open to the atmosphere an organic phase containing the lecithin component and warmer than about 20° C adding water in emulsion forming proportions and without substantial emulsification, closing the container to the atmosphere and injecting normally gaseous liquid propellant in a container pressurizing amount into the container in a manner emulsifying together the water and lecithin to a water in oil emulsion of said lecithin.

* * * * *